US007095856B2

(12) United States Patent
Logalbo et al.

(10) Patent No.: US 7,095,856 B2
(45) Date of Patent: Aug. 22, 2006

(54) METHOD AND APPARATUS TO MAINTAIN ENCRYPTION SYNCHRONIZATION IN A MULTI-MODULATION TDM SYSTEM

(75) Inventors: Robert D. Logalbo, Hoffman Estates, IL (US); Alan Conrad, St. Charles, IL (US); Darrell Stogner, Planation, FL (US)

(73) Assignee: Motorola, Inc., Schaumburg, IL (US)

( * ) Notice: Subject to any disclaimer, the term of this patent is extended or adjusted under 35 U.S.C. 154(b) by 922 days.

(21) Appl. No.: 10/112,990

(22) Filed: Mar. 29, 2002

(65) Prior Publication Data

US 2003/0188148 A1 Oct. 2, 2003

(51) Int. Cl.
*H04K 1/00* (2006.01)
*G06F 1/12* (2006.01)
*H04B 7/212* (2006.01)

(52) U.S. Cl. .................. 380/274; 380/270; 713/375; 370/324

(58) Field of Classification Search ............. 380/37, 380/43, 274, 262, 270, 277; 455/51.1; 370/321, 370/324, 347, 350; 713/150, 375; 709/248; 375/354, 358; 725/31
See application file for complete search history.

(56) References Cited

U.S. PATENT DOCUMENTS

| | | | |
|---|---|---|---|
| 4,642,424 A | 2/1987 | McNair | |
| 4,803,726 A * | 2/1989 | Levine et al. ............... | 380/274 |
| 4,928,274 A | 5/1990 | Gilhousen et al. | |
| 5,060,266 A | 10/1991 | Dent | |
| 5,161,189 A | 11/1992 | Bray et al. | |
| 5,222,142 A * | 6/1993 | Kent ........................... | 380/46 |
| 5,694,473 A | 12/1997 | Bright et al. | |
| 5,825,889 A * | 10/1998 | Dent ........................... | 380/270 |
| 6,044,086 A | 3/2000 | Albrow et al. | |
| 6,081,600 A * | 6/2000 | Blanchard et al. .......... | 380/255 |
| 6,778,558 B1 * | 8/2004 | Balachandran et al. ..... | 370/470 |
| 6,795,419 B1 * | 9/2004 | Parantainen et al. ........ | 370/337 |
| 6,798,791 B1 * | 9/2004 | Riazi et al. ................. | 370/515 |
| 6,862,272 B1 * | 3/2005 | Dulin et al. ................ | 370/330 |
| 2003/0003896 A1* | 1/2003 | Klingler et al. ............ | 455/411 |
| 2003/0206538 A1* | 11/2003 | Rezaiifar et al. ........... | 370/335 |

* cited by examiner

*Primary Examiner*—Emmanuel L. Moise
*Assistant Examiner*—Minh Dieu Nguyen
(74) *Attorney, Agent, or Firm*—Steven R. Santema; Valerie M. Davis

(57) ABSTRACT

Encryption synchronization (e-sync) is maintained between a transmitter (104) and one or more receivers (102) in a multi-modulation TDM system (100) where information is communicated in slots (402) comprising a slot header (404) and one or more data blocks (406), and wherein the data blocks are eligible to be encoded at different modulation rates thereby creating a likelihood of different numbers of blocks in different slots. The receiver and transmitter employ respective encryption elements (200, 300) comprising e-sync shifter elements (202, 302) and encryption algorithm blocks (204, 304). The e-sync shifter element provides an e-sync signal defining an encryption state vector to the encryption algorithm block and is operable to advance the encryption state vector (in the case of the receiver) according to a number of received bits plus a variable number of bits. The variable number depends on the number of bits within a block, the maximum number of blocks that could be within a slot and the actual number of blocks within the slot.

11 Claims, 4 Drawing Sheets

METHOD AND APPARATUS TO MAINTAIN ENCRYPTION SYNCHRONIZATION IN A MULTI-MODULATION TDM SYSTEM

FIELD OF THE INVENTION

This invention relates generally to communication systems and, more particularly, to encrypted communication systems including, but not limited to time-division multiplexed (TDM) systems that are eligible to use different modulation rates within the same TDM slot.

BACKGROUND OF THE INVENTION

Encrypted voice and data systems are well known. Many of these systems provide secure communications between two or more users by sharing one or more pieces of information between the users, thereby permitting only those users knowing the information to properly decrypt the message. Generally speaking, an encryption algorithm is used by peer devices to encrypt or decrypt voice and data messages. The encryption algorithm is a nonlinear mathematical function defined by an initial starting vector and a key variable (or "key") that generates a pseudo-random sequence, known as a keystream. The keystream is XORed (exclusive "or" function, as known in the art) with plain (unencrypted) text to generate cipher text. The cipher text is transmitted to a receiver over a communication channel, which may comprise, for example, a radio frequency (RF) channel. The receiver XORs the received cipher text with a keystream, generated from the same key and encryption algorithm as used by the transmitter, yielding a plain text (decrypted) output.

It is well known that proper decryption can not occur unless a receiver achieves synchronization with the transmitter, i.e., to lineup its encryption stage with the encryption stage of the transmitter. To that end, encryption synchronization (also known as e-sync) information is periodically sent over the communication channel to initiate and maintain synchronization between a transmitter and one or more receivers. As will be appreciated, there are a variety of possible modes of operation for sending such e-sync information, depending on characteristics of the RF channel, modulation type(s), bandwidth limitations and the like.

Generally, in TDM systems, e-sync bit(s) are interleaved among data blocks intended for particular receiver(s), wherein the data blocks form part of a TDM slot. Typically, both the data blocks and slots include a fixed number of bits encoding a plurality of modulation symbols (e.g., 16-QAM symbols). The number of bits per symbol (and hence the number of symbols per block) varies according to the type of modulation employed. Most advantageously, the e-sync bit(s) are sent once every several slots (as opposed to each slot), yet within a predetermined maximum delay period for late entry, to achieve an optimal tradeoff of bandwidth utilization versus quality. A receiver obtains initial synchronization by looking at consecutive slots until it finds an e-sync block that identifies a starting vector for its encryption algorithm. Once the encryption state is initialized, a receiver maintained e-sync by advancing its encryption state corresponding to the number of received bits. Historically, the type of modulation did not vary from block to block, thus a receiver could maintain e-sync by simply counting the number of received modulation symbols, or the amount of time elapsed, and advancing a linear feedback shift register (LFSR) sequence a fixed number of bits for each received symbol.

Recent advances in technology have produced TDM systems that are eligible to use different modulation types within different blocks of the same or different slots, and wherein different blocks may be destined for different receivers. One such system is described in U.S. patent application Ser. No. 09/760,981, titled "Slot Format and Acknowledgment Method for a Wireless Communication System," filed Jan. 16, 2001, incorporated herein by reference in its entirety. Generally, in such system, the number of bits per block is fixed, but the number of bits per slot will vary according to the modulation type(s) used within the slot.

A problem that arises is that channel impairments introduced during transmission may cause the receiver to be unable to successfully decode all or portions of one or more blocks. Consequently, in a multi-modulation TDM system, a receiver may not know what type of modulation symbols are used within certain blocks (and hence the number of bits per slot) or whether it is the intended receiver for certain blocks. As a result, the receiver does not know how many bits to advance its encryption state from block to block to maintain encryption sync.

Accordingly, there is a need for a method and apparatus that facilitates maintaining e-sync between a transmitter and one or more receivers in a multi-modulation TDM system. Advantageously, the method and apparatus will provide for the receivers advancing their encryption state to maintain e-sync without necessarily having knowledge of the number(s) and type(s) of modulation symbols within each block or the number of bits used from slot to slot, and without relying on peer-to-peer messaging. The present invention is directed to addressing these needs.

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

Figure 1:
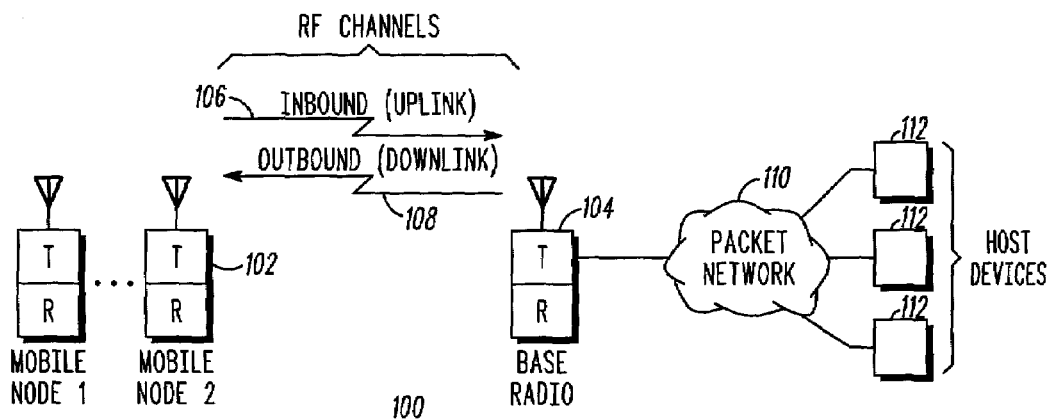
FIG. 1 is a block diagram of an encrypted communication system according to one embodiment of the present invention.

Turning now to the drawings and referring initially to FIG. 1, there is shown an encrypted communication system 100 including one or more mobile nodes 102 and at least one base radio 104 (sometimes called a "base station"). The mobile nodes 102 comprise wireless devices (which may include, but are not limited to, laptop computers, wireless mobile or portable two-way radios, cellular radio/telephones, personal digital assistants (PDAs) and the like) equipped for wireless communication with the base radio 104 over RF channel(s) 106, 108. The base radio 104 is connected via a packet network 110 to various endpoint devices 112. In one embodiment, the mobile nodes 102 and endpoints 112 are Internet Protocol (IP) addressable host devices equipped for sending and/or receiving IP datagrams (or packets) with each other via the RF channels 106, 108 and packet network 110.

The mobile nodes 102 and the base radio 104 include respective memory (not shown) and processors (not shown), such as microprocessors, microcontrollers, digital signal processors or combinations of such devices for storing and executing software routines, respectively, within the mobile nodes and base radio. The processing functionality residing within the base radios and mobile nodes that perform physical layer processing (e.g., encoding and decoding data) is known as "layer 1" processing. The processing functionality that supports over-the-air (e.g., RF) communications is known in the art as "layer 2" functionality. Higher level processing functions, for example, forming or interpreting IP packets is known as "layer 3" functionality.

In the preferred embodiment, the layer 2 employs TDMA technology that supports multiple modulation types, and multiple subscribers per slot, which slots are communicated via RF channels 106, 108. Channel 106 (called the inbound channel, or "uplink") is used for communication from the mobile nodes 102 to the base radio 104 and channel 108 (called the outbound channel, or "downlink") is used for communication from the base radio 104 to the mobile nodes 102.

Channels 106, 108 may comprise different frequencies (known as frequency division duplexing, or FDD) or the same frequencies (known as time division duplexing, or TDD). On the uplink 106, one or more mobile nodes 102 take turns transmitting in different TDMA slots. On the downlink 108, the base radio 104 usually transmits in entire slot(s) which may include blocks destined for different mobile nodes 102. The bandwidth dedicated for channels 106, 108 may comprise a fixed bandwidth, as is well known, or may be scalable between multiple bandwidths, such as described in U.S. patent application Ser. No. 09/630,235, titled "Scalable Pattern Methodology for Multi-Carrier Communication Systems," filed Aug. 1, 200 and incorporated herein by reference in its entirety.

In one embodiment, the blocks distributed among the TDMA slots are eligible to be modulated at different modulation rates within the same or different slots on either the uplink or downlink, such as described in U.S. patent application Ser. No. 09/760,981, titled "Slot Format and Acknowledgment Method for a Wireless Communication System," filed Jan. 16, 2001, incorporated herein by reference in its entirety. The different modulation rates define different numbers of bits per symbol corresponding to different modulation types, which modulation types may or may not include forward error correction (FEC).

As is well known, FEC comprises adding redundant bits to an information signal to facilitate error correction in the received signal. Typically, the redundant bits are added according to a convolutional code whereby the amount of redundancy is expressed as a fraction. For example, a ⅔ rate convolutional code produces 3 bits of encoded information (i.e., 1 redundant bit) for every 2 bits of data and a ½ rate convolutional code produces 2 bits of encoded information (i.e., 1 redundant bit) for every 1 bit of data. Generally, higher rate code(s) are used for delay-sensitive data that can tolerate some errors (such as, for example, data representative of voice or video) whereas lower rate codes are used for error-intolerant data that can tolerate relatively greater delays.

For purposes of example but not limitation, Tables 1 and 2 below identify various modulation types and corresponding rates for a representative system with and without FEC, respectively. As shown, the different modulation types are selected from among: 4-QAM, 16-QAM, 64-QAM and 256-QAM. As will be appreciated, the present invention may be implemented with different levels of QAM and/or modulation types other than QAM.

TABLE 1

| MODULATION TYPE | FEC | # INFORMATION BITS/SYMBOL |
|---|---|---|
| 4-QAM | 1/2 | 1 |
| 16-QAM | 1/2 | 2 |
| 64-QAM | 2/3 | 4 |
| 256 QAM | 3/4 | 6 |

TABLE 2

| MODULATION TYPE | FEC | # INFORMATION BITS/SYMBOL |
|---|---|---|
| 4-QAM | N/A | 2 |
| 16-QAM | N/A | 4 |
| 64-QAM | N/A | 6 |
| 256 QAM | N/A | 8 |

Figure 2:
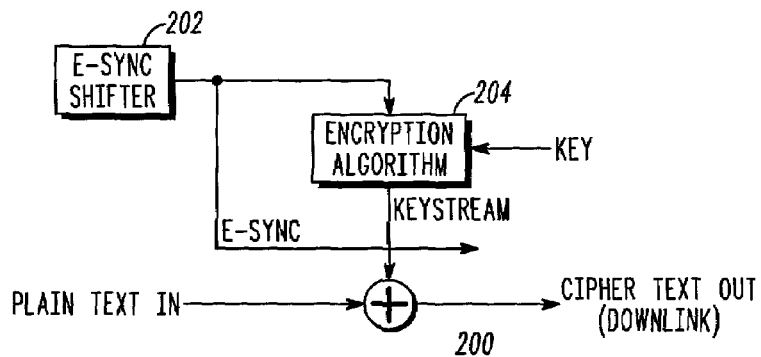
FIG. 2 is a block diagram illustrating an encryption function performed by a transmitting base radio in the encrypted communication system of FIG. 1.
Figure 3:
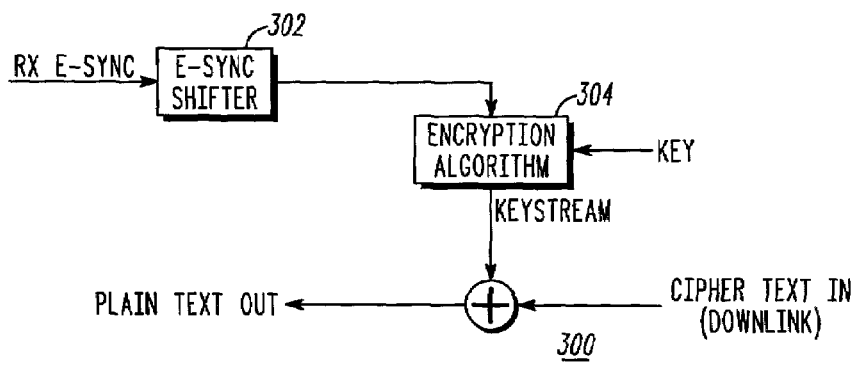
FIG. 3 is a block diagram illustrating a decryption function performed by a receiving mobile node in the encrypted communication system of FIG. 1.

FIG. 2 shows an encryption element 200 of a base radio, acting as transmitter, to encrypt messages transmitted over the RF channel 108 and FIG. 3 shows a corresponding encryption element 300 of a receiving mobile node according to one embodiment of the present invention. The encryption elements 200, 300 are layer 2 functional elements that support maintaining e-sync in a multi-modulation TDM system.

The encryption elements 200, 300 comprise respective e-sync "shifter" blocks 202, 302 logically connected to encryption algorithm blocks 204, 304. The e-sync shifter blocks 202, 302 provide an e-sync signal defining an encryption state vector that is input to the encryption algorithm block 204. In one embodiment, the e-sync shifter block 202 (FIG. 2) of the transmitter, upon initialization, provides an encryption state vector that defines an initial starting state of a shift register (e.g., LFSR) sequence, substantially as known in the art. The initial e-sync vector is sent over-the-air to the e-sync shifter block 302 of the receiver in one or more TDM slots (typically, within data block(s) of the TDM slots). In one embodiment, the TDM slots are 10 milliseconds in duration and the e-sync vector is sent once every 32 slots, thus at worst case, the e-sync vector will be received within 320 milliseconds.

The encryption algorithm blocks 204, 304 execute a non-linear encryption algorithm defined by the encryption state vector and a shared key, yielding a keystream. In the case of the base radio acting as transmitter (FIG. 2), the keystream is XORed with plain (unencrypted) text to generate cipher text to be transmitted via the downlink 108. In the case of the mobile node acting as receiver (FIG. 3), the keystream is XORed with cipher text input to provide decrypted (plain) text output to the mobile node.

As has been noted, the present invention is adapted for use in a TDM system that is eligible to use multiple modulation types within the same slot. Further, the present invention contemplates that a receiver may be unable to successfully decode all or portion of certain slots. Consequently, a receiver may not know what modulation rate(s) are used, and hence may not know how many bits to advance its encryption state from slot to slot. According to one embodiment of the present invention, e-sync is maintained by the respective e-sync shifter blocks 202, 302 of the transmitter and receiver advancing (or clocking) their encryption states the same number of bits every slot, regardless of whether the slot was successfully decoded or whether the slot included blocks destined for the receiver. The amount of bits a receiver advances is determined by assuming of the worst case: that every slot contains the maximum amount of data bits (corresponding to the number of bits in the slot if each block were encoded at the maximum modulation rate). In turn, the transmitter advances the same number of bits as the receiver to maintain e-sync.

Thus, contrary to prior art encryption systems, the amount of bits needed to advance the encryption state (or clock its shift register) from slot to slot may differ from the number of bits transmitted in the slot (unless the slot contains the maximum number of bits), thereby defining a necessary "shift" to maintain e-sync. The amount of necessary shift will generally differ from slot to slot. This is perhaps best observed with reference to FIG. 4.

Figure 4:
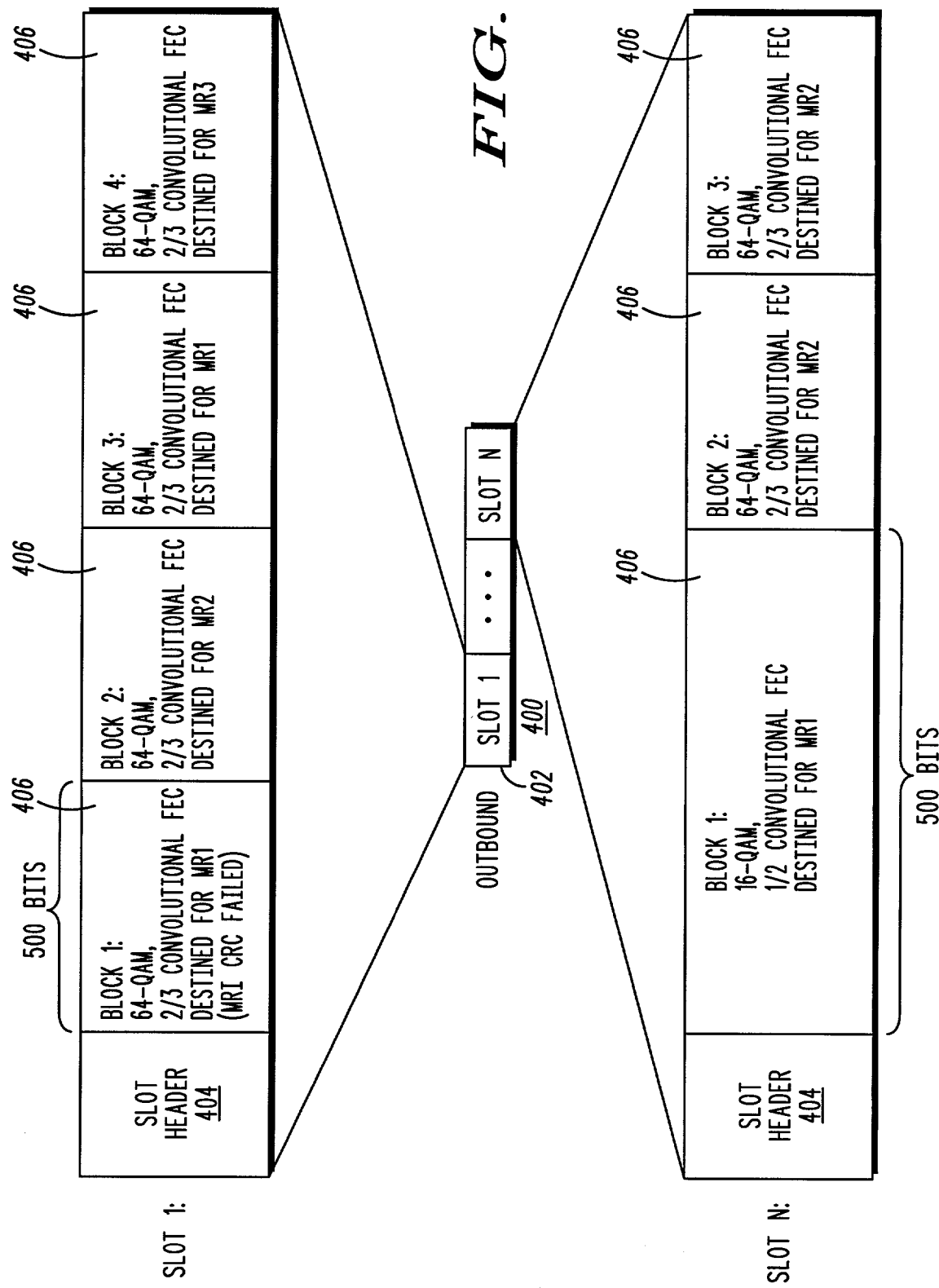
FIG. 4 illustrates an example outbound message transmission of a TDM system that is eligible to use different modulation rate(s) within the same or different slots.

FIG. 4 illustrates an outbound message 400 transmitted from the base radio 104 to one or more mobile nodes 102. As will be appreciated, the outbound message 400 is provided by way of example and not limitation. The present invention may be implemented for use on a variety of inbound, as well as outbound messages.

The outbound message 400 comprises a sequence of TDM slots 402 (denoted "slot 1" to "slot N"). Each slot 402 comprises a slot header 404 followed by one or more data blocks 406. The slot headers 404 contain information describing the layout of the respective slots (i.e., the number of blocks, the type of modulation used within each block, the intended receiver for each block, etc.) and the data blocks 406 include data intended for one or more receivers. As has been described, the modulation rate and/or the intended receiver may differ from block to block within the same or different slots.

As shown, slot 1 contains 4 blocks, each using 64-QAM modulation with ⅔ rate convolutional encoding. Assume for purposes of the example that 64-QAM with ⅔ rate is the maximum modulation rate used in the system and there are 500 data bits in each block. Thus, slot 1, including 2000 bits (i.e., 4×500) represents the maximum amount of data in a slot. As will be appreciated, the actual number of data bits per block is somewhat arbitrary and may vary from the uplink to downlink as well as for different modulation bandwidths.

Assume further that in slot 1, the block 1 is destined for a first mobile node ("MN1") and MN1 knows the slot format but, due to CRC failure or some other reason, MN1 was unable to determine that it is the intended recipient of block 1; block 2 is destined for and successfully received by a second mobile node ("MN2"); block 3 is destined for and successfully received by MN1;and block 4 is destined for and successfully received by a third mobile node ("MN3").

According to one embodiment of the invention, MN1 will clock and throw out 1000 bits (i.e., 500 bits for block 1, 500 bits for block 2), clock and use the next 500 bits destined for itself and clock and throw out the next 500 bits; MN2 will clock and throw out the first 500 bits, clock and use the next 500 bits and clock and throw out the next 1000 bits; and MN3 will clock and throw out the first 1500 bits and clock and use the last 500 bits to maintain e-sync for the next slot. Thus, MN1, MN2 and MN3 have each clocked or advanced their encryption states the same number (e.g., 2000 bits) in slot 1 and are now ready to decrypt any data which may be destined to them in the following slot. Since in this case slot 1 contained the maximum number of bits, the number of bits advanced corresponds exactly to the number of bits in the slot, thereby defining zero shift.

Next consider block "N." Block N contains 3 blocks, block 1 using 16-QAM modulation with ½ rate convolutional encoding and blocks 2 and 3 using 64-QAM modulation with ⅔ rate convolutional encoding. Assume for purposes of the present example that block 1 is destined for and successfully received by MN1; and blocks 2 and 3 are destined for and successfully received by MN2. Assume further that MN3 did not receive the slot header and thus neither knows the slot format nor the intended target of the blocks within the slot.

According to one embodiment of the invention, MN1 will clock and use the first 500 bits and clock and throw out 1500 bits (500 bits for blocks 2, 3 plus 500 bits shift); MN2 will clock and throw out the first 500 bits, clock and use the next 1000 bits (blocks 2, 3) and clock and throw out 500 bits shift; and MN3 will clock and throw out 2000 bits (500 bits for blocks 1, 2, 3 plus 500 bits shift) to maintain e-sync for the next slot. Thus, MN1, MN2 and MN3 have again clocked or advanced their encryption states a total of 2000 bits in slot N. Since in this case the number of received bits is 500 fewer than the maximum number of bits, a shift of 500 bits is needed to maintain e-sync.

The base station advances its encryption state the same number of bits as the mobile nodes to maintain e-sync, which may also require a shift in excess of the number of bits transmitted in the slot. Thus, continuing the present example, the base station will clock 2000 bits for both slot 1 and slot N. In the case of slot 1, this represents zero shift (i.e., 2000 bits maximum in the slot minus 2000 bits transmitted) whereas, in the case of slot N, this represents 500 bits shift (i.e., 2000 bits maximum in the slot minus 1500 bits transmitted).

As will be appreciated, the same situation occurs in the case of inbound slots. The base station, acting as receiver, must assume the worst case-that a mobile node tried to transmit inbound at the highest rate, but the inbound transmission wasn't successfully decoded. Therefore, assuming the size of an inbound slot is the same as the outbound slot of the present example, all mobile nodes must clock 2000 bits every slot regardless of how many bits, if any, they actually transmitted.

Figure 5:
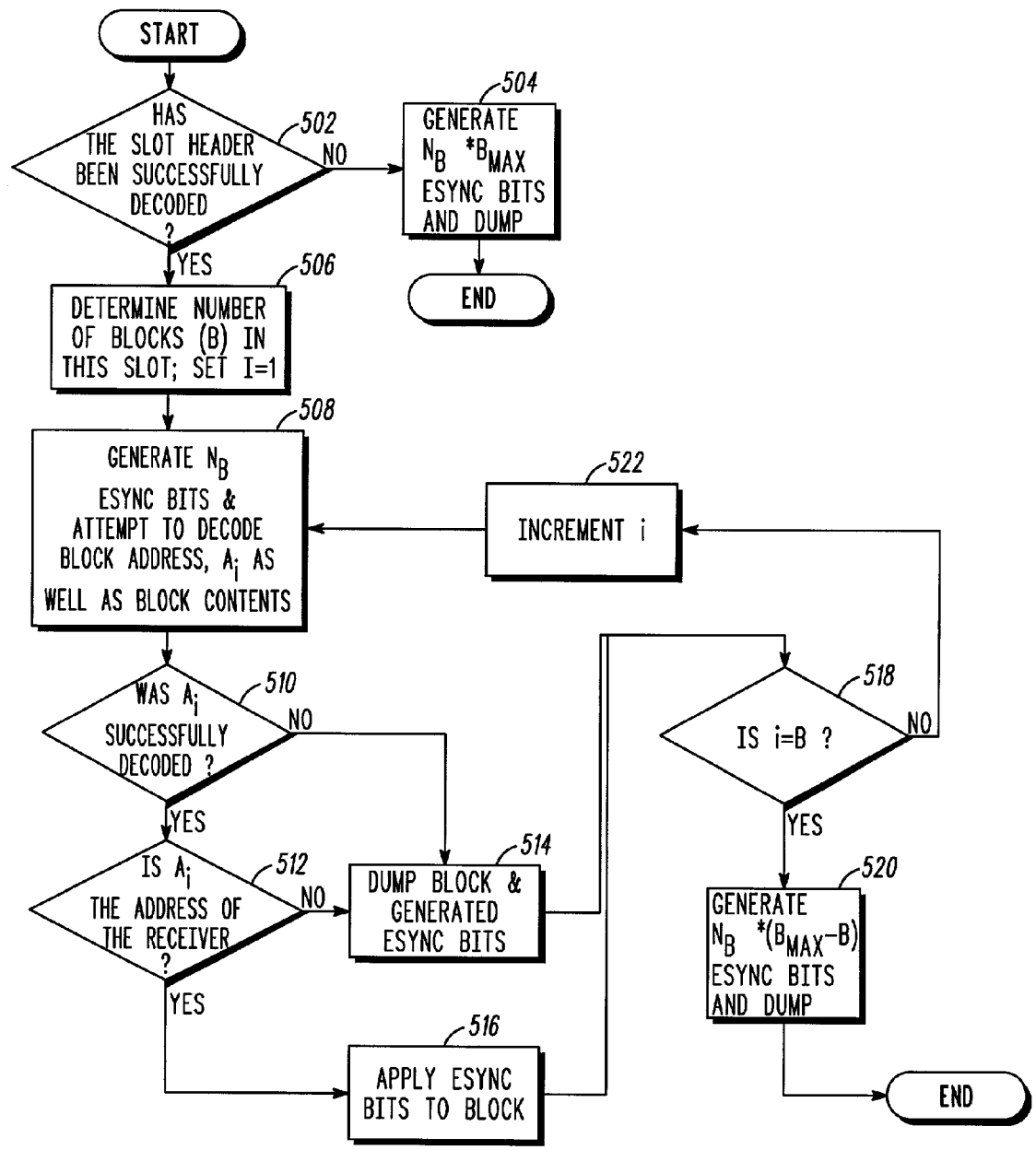
FIG. 5 is a flowchart showing steps performed by a receiver to maintain encryption synchronization in a multi-modulation TDM system according to one embodiment of the present invention.
Figure 6:
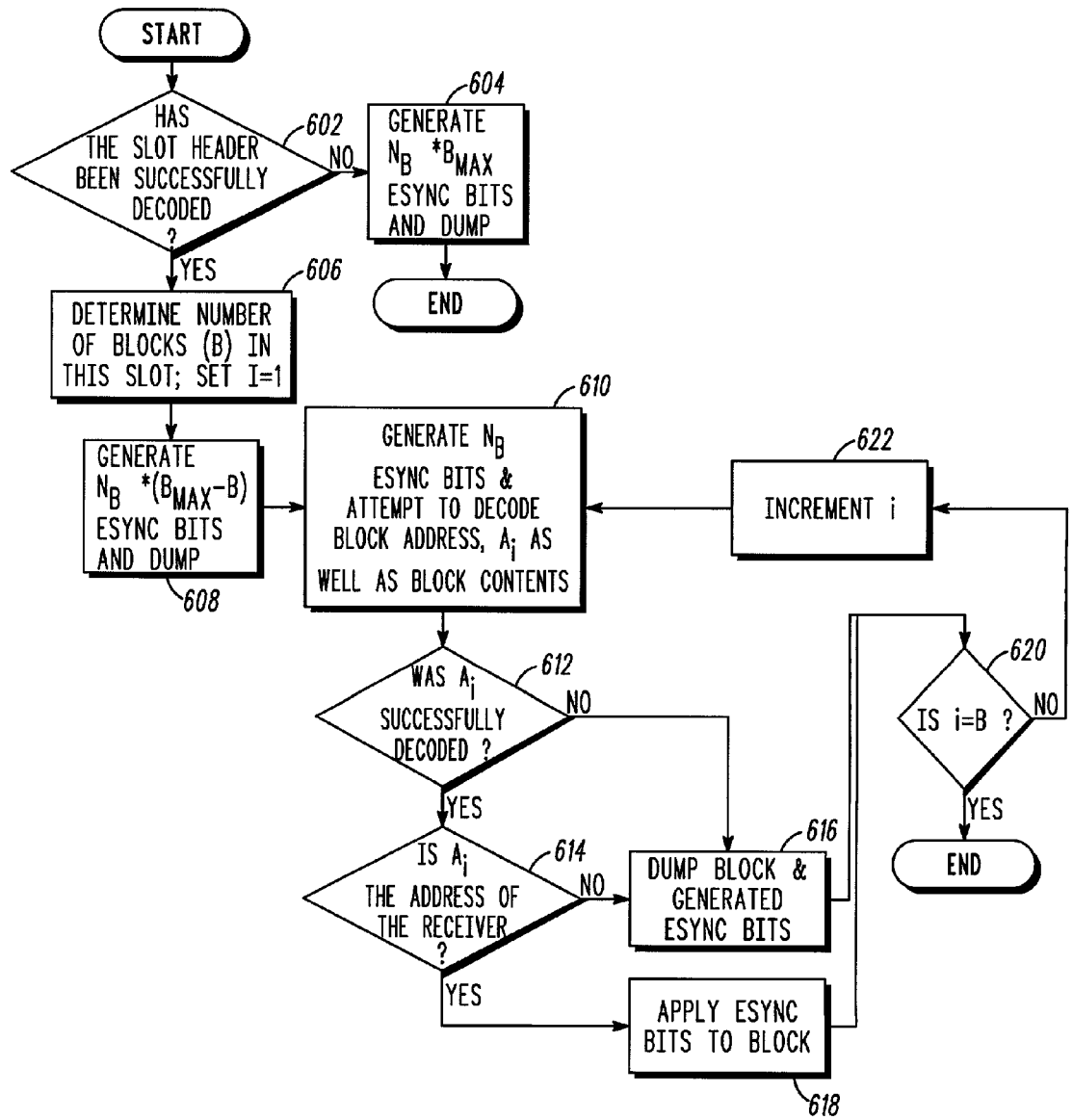
FIG. 6 is a flowchart showing steps performed by a receiver to maintain encryption synchronization in a multi-modulation TDM system according to another embodiment of the present invention.

FIG. 5 and FIG. 6 are flowcharts showing steps performed by receivers to maintain e-sync in a multi-modulation TDM system according to alternative embodiments of the present invention. For convenience, the term NB will refer to the number of bits in a block, $B_{MAX}$ will refer to the maximum number of blocks in a slot, B is the number of blocks in a given slot, i is an iterative variable and $A_i$ is a block address (identifying a targeted recipient of the i'th block).

Turning now to FIG. 5, at step 502, the receiver (e.g., base radio or mobile node), upon receiving and attempting to decode a slot, determines whether the slot header has been successfully decoded. If not, the receiver will not know the type of modulation(s) used within the slot or the intended recipient of any of the blocks. In such case, at step 504, the receiver generates and dumps $N_B \times B_{MAX}$ e-sync bits to maintain e-sync. For example, with reference to FIG. 4, the receiver will generate 2000 bits (i.e., 500×4) and advance its e-sync accordingly.

If the slot header is successfully decoded at step 502, the receiver determines at step 506 the number of blocks (B) in the present slot and sets the iterative variable i=1. From the slot header, the receiver will also know the number of bits $N_B$ in each block. At step 508, the receiver generates NB e-sync bits for the ith block (initially the first block) and attempts to decode the block address $A_i$ as well as the block contents of the ith block.

At step 510, the receiver determines whether $A_i$ is successfully decoded, such that the receiver is able to determine the targeted recipient of the ith block. If not, at step 514, the receiver dumps the block and the $N_B$ e-sync bits generated at step 508. For example, with reference to FIG. 4, slot 1, block 1, MN1 knows the slot format but does not know the intended recipient of block 1, thus MN1 will generate and dump $N_B$=500 bits for block 1.

If $A_i$ is successfully decoded, the receiver determines at step 512 whether it is the targeted recipient of the ith block. If not, at step 514, the receiver dumps the block and the $N_B$ e-sync bits generated at step 508. Otherwise, if $A_i$ is successfully decoded and the receiver is the targeted recipient, the receiver applies the generated e-sync bits to the block at step 516 to decrypt and "use" the bits (i.e., process the information) contained within the block. For example, with reference to FIG. 4, slot 1, block 1, MN3 knows the slot format of block 1 and knows that MN1, not itself, is the intended recipient of block 1. Thus, MN3 will generate and dump $N_B$=500 bits for block 1. In the case of slot 1, block 4, MN3 knows the slot format of block 4 and knows that it is the intended recipient, thus it generates and uses $N_B$=500 bits for block 4.

Next, at step 518, the receiver determines whether i=B, or whether the present (i.e., ith) block is the last block of the present slot. If not, the receiver increments i and proceeds to step 508, etc. with the next subsequent block. Otherwise, if the present block is the last block of the slot, the receiver generates and dumps an amount $N_B \times (B_{MAX} - B)$ of bits to shift its internal shift register to maintain e-sync. For example, with reference to FIG. 4, slot N, each of the receivers MN1, MN2, MN3 generate 500 shift bits (i.e., 500×(4−3)) to maintain e-sync after processing the last block.

Now turning to FIG. 6, there will be described an alternative embodiment for receiver(s) to maintain e-sync in a multi-modulation TDM system. At step 602, the receiver (e.g., base radio or mobile node), upon receiving and attempting to decode a slot, determines whether the slot header has been successfully decoded. If not, the receiver will not know the type of modulation(s) used within the slot or the intended recipient of any of the blocks. In such case, at step 604, the receiver generates and dumps $N_B \times B_{MAX}$ e-sync bits to maintain e-sync, substantially as described with reference to FIG. 5, step 504.

If the slot header is successfully decoded at step 602, the receiver determines at step 606 the number of blocks (B) in the present slot and sets the iterative variable i=1. In one embodiment, the receiver knows a priori (i.e., prior to receiving the slot header) the number of bits $N_B$ in each block, which is constant for a given bandwidth and signal direction (i.e., inbound or outbound). Alternatively, the receiver may determine the number of blocks from the slot header (i.e., after receiving and successfully decoding the slot header).

At step 608, the receiver generates and dumps $N_B \times (B_{MAX} - B)$ e-sync bits to shift its internal shift register. Thus (in contrast to the flowchart of FIG. 5, where the "shift" bits are determined and clocked after processing the last block), the number of shift bits are determined and clocked before processing the first block.

At step 610, the receiver generates $N_B$ e-sync bits for the ith block (initially the first block) and attempts to decode the block address $A_i$ as well as the block contents of the ith block.

At step 612, the receiver determines whether $A_i$ is successfully decoded, such that the receiver is able to determine the targeted recipient of the ith block. If not, at step 616, the receiver dumps the block and the $N_B$ e-sync bits generated at step 610.

If $A_i$ is successfully decoded, the receiver determines at step 614 whether it is the targeted recipient of the ith block. If not, at step 616, the receiver dumps the block and the $N_B$ e-sync bits generated at step 610. Otherwise, if $A_i$ is successfully decoded and the receiver is the targeted recipient, the receiver applies the generated e-sync bits to the block at step 618 to decrypt and use the bits contained within the block.

Next, at step 620, the receiver determines whether i=B, or whether the present (i.e., ith) block is the last block of the present slot. If not, the receiver increments i and proceeds to step 610, etc. with the next subsequent block. If the present block is the last block of the slot, the process ends and the receiver is ready to process the next slot.

The present disclosure has identified an apparatus and methods for senders and receivers to maintain e-sync in a multi-modulation TDM system, whereby a receiver may not know the type(s) of modulation used (and hence the number of bits) within certain slots, or whether it is the intended recipient of certain blocks. The methods do not rely on peer-to-peer messaging to maintain e-sync.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for a receiving device to maintain encryption synchronization in a multi-modulation TDM system whereby information is communicated in slots comprising a slot header and one or more data blocks, the data blocks each including a number of bits ($N_B$) and being eligible to be encoded at different respective modulation rates thereby creating a likelihood of different numbers of blocks in different slots, the method comprising:

attempting, by the receiving device, to determine a number of blocks (B) in at least a first received slot;

if the receiving device can not determine the number of blocks (B) in the first slot, determining a maximum number of blocks ($B_{MAX}$) that could be within the slot; and advancing an encryption state of the receiving device a number of bits ($N_B \times B_{MAX}$);

if the receiving device determines the number of blocks (B) in the first slot, advancing the encryption state of the receiving device $B \times N_B$ bits, thereby corresponding to the number of bits in the first slot; and advancing the encryption state $N_B \times (B_{MAX} - B)$ bits defining a shift of zero or more bits in addition to the number of bits in the first slot.

2. The method of claim 1, wherein the step of attempting to determine the number of blocks (B) in at least a first slot comprises attempting to decode the slot header of the first slot, wherein the slot header defines at least the number of blocks (B) in the first slot.

3. The method of claim 1, wherein the step of determining a maximum number of blocks ($B_{MAX}$) that could be within the slot comprises:
   determining a maximum modulation rate that is eligible to be used within the slot; and
   determining a number of blocks that would occur in the slot corresponding to the maximum modulation rate.

4. The method of claim 1, wherein the step of advancing the encryption state of the receiving device the number of bits ($N_B \times B_{MAX}$) comprises:
   decoding, by the receiving device, $N_{11} \times B_{MAX}$ bits; and
   advancing a shift register in an encryption device associated with the receiving device, a number of bits corresponding to the $N_B \times B_{MAX}$ bits.

5. The method of claim 1, wherein the step of advancing the encryption state $N_B \times (B_{MAX} - B)$ bits is accomplished after the step of advancing the encryption state of the receiving device $B \times N_B$ bits.

6. The method of claim 1, wherein the step of advancing the encryption state $N_B \times (B_{MAX} - B)$ bits is accomplished prior to the stop of advancing the encryption state of the receiving device $B \times N_B$ bits.

7. The method of claim 1 claim 5, wherein the step of advancing the encryption state of the receiving device $B \times N_B$ bits comprises:
   for each consecutive block, generating $N_B$ hits, and advancing a shift register corresponding to the $N_B$ bits.

8. The method of claim 7, further comprising:
   for each consecutive block, attempting to determine a targeted recipient of the block; and
   if the receiving device can not determine the targeted recipient of a block, discarding the block and the $N_B$ bits generated for the block.

9. The method of claim 8, further comprising:
   if the receiving device determines itself not to be the targeted recipient of a block, discarding the block and the Na bits generated for the block.

10. The method of claim 8, further comprising: if the receiving device determines itself to be the targeted recipient of a block, apply the $N_B$ hits to the block to process the block.

11. An encryption element comprising:
   an e-sync shifter element; and
   an encryption algorithm block,
   the e-sync shifter element being operable to provide an e-sync signal defining an encryption state vector to the encryption algorithm block, the e-sync shifter element being operable to advance the encryption state vector according to a number of received bits plus a variable number of zero or more bits;
   wherein the encryption element is employed in a multi-modulation TDM system whereby information is communicated in slots comprising a slot header and one or more data blocks, the data blocks each including a number of bits ($N_B$) and being eligible to be encoded at different respective modulation rates thereby creating a likelihood of different numbers of blocks in different slots, the variable number comprising $N_B \times (B_{MAX} - B)$ bits, wherein $B_{MAX}$ defines a maximum number of blocks that could be within a slot and B defines the actual number of blocks within the slot.

* * * * *

UNITED STATES PATENT AND TRADEMARK OFFICE
CERTIFICATE OF CORRECTION

PATENT NO. : 7,095,856 B2 Page 1 of 1
APPLICATION NO. : 10/112990
DATED : August 22, 2006
INVENTOR(S) : Logalbo et al.

It is certified that error appears in the above-identified patent and that said Letters Patent is hereby corrected as shown below:

In Claim 4, column 9, line 19, change "$N_{11}$" to --$N_B$--

In Claim 7, column 9, line 31, delete "claim 5"

In Claim 7, column 9, line 34, change "hits" to --bits--

In Claim 9, column 10, line 10, change "Na" to --$N_B$--

Signed and Sealed this

First Day of May, 2007

JON W. DUDAS
*Director of the United States Patent and Trademark Office*